United States Patent
Sinda

(10) Patent No.: US 8,312,671 B2
(45) Date of Patent: Nov. 20, 2012

(54) MULTI-CHAMBER LINE AND SYSTEM FOR PLANT IRRIGATION AND FERTIGATION AND ASSOCIATED METHODS

(75) Inventor: Edmund A. Sinda, Bradenton, FL (US)

(73) Assignee: Developmental Technologies, LLC, Bradenton, FL (US)

(*) Notice: Subject to any disclaimer, the term of this patent is extended or adjusted under 35 U.S.C. 154(b) by 0 days.

(21) Appl. No.: 12/968,837

(22) Filed: Dec. 15, 2010

(65) Prior Publication Data

US 2011/0179705 A1 Jul. 28, 2011

Related U.S. Application Data

(60) Provisional application No. 61/297,972, filed on Jan. 25, 2010.

(51) Int. Cl.
*A01G 25/06* (2006.01)
*A01G 29/00* (2006.01)
(52) U.S. Cl. ....................................................... 47/48.5
(58) Field of Classification Search ............... 47/48.5, 47/20.1, 21.1, 40.5
See application file for complete search history.

(56) References Cited

U.S. PATENT DOCUMENTS

| | | | |
|---|---|---|---|
| 2,566,833 A * | 9/1951 | Healy | 239/450 |
| 3,860,177 A * | 1/1975 | Huffaker | 239/450 |
| 3,888,418 A | 6/1975 | Seith et al. | |
| 3,996,968 A | 12/1976 | Bergman et al. | |
| 4,474,330 A * | 10/1984 | Langa | 239/450 |
| 4,948,295 A | 8/1990 | Pramsoler | |
| 6,045,869 A * | 4/2000 | Gesser et al. | 427/385.5 |
| 6,227,837 B1 * | 5/2001 | Keller et al. | 425/112 |
| 6,540,158 B1 | 4/2003 | Vered | |
| 7,198,431 B2 | 4/2007 | Gesser | |
| 2007/0252023 A1 | 11/2007 | Walter et al. | |
| 2010/0170961 A1* | 7/2010 | Sinda | 239/126 |

OTHER PUBLICATIONS

International Preliminary Report on Patentability mailed Aug. 16, 2012 received in PCT/US11/22014 (7 pages).

* cited by examiner

*Primary Examiner* — Kristen C Hayes
(74) *Attorney, Agent, or Firm* — Holland & Knight LLP; John P. Moran, Esq.

(57) ABSTRACT

A line, system, and method are provided for delivering a plurality of fluids to a target plant array at a plurality of pressures. The line comprises a plurality of tubes at least portions of which are hydrophilic. The tubes are connected together to form a co-extensive, multi-chambered delivery system. Each tube is connectable at a proximal end to a source of fluid, preferably comprising at least two different fluids. By having a unitary system positioned in the soil, redundancy of equipment, labor, and systems can be reduced, with the instant system able to perform the functions of multiple systems.

1 Claim, 1 Drawing Sheet

MULTI-CHAMBER LINE AND SYSTEM FOR PLANT IRRIGATION AND FERTIGATION AND ASSOCIATED METHODS

CROSS-REFERENCE TO RELATED APPLICATION

This application claims priority to provisional patent application Ser. No. 61/297,972, filed Jan. 25, 2010.

TECHNOLOGICAL FIELD

The technological field generally relates to apparatus and methods for irrigating and fertilizing plants.

BACKGROUND

In regions where water is scarce, and as water becomes scarce in other regions, highly efficient irrigation and fertigation systems that use a minimum of water and fertilizers become increasingly important. A highly efficient irrigation system comprises a porous membrane operating under low pressure (U.S. Pat. No. 7,198,431, co-owned with the present application, the contents of which are incorporated hereinto by reference). This disclosure is directed to a system and method for efficiently delivering an aqueous solution to plants that includes a hydrophilic delivery device, for example, tubing, that has a distal portion positionable adjacent a root system of a plant and a lumen for channeling an aqueous solution from an inlet to the distal portion. At least a portion of the device's wall along the distal portion has a porosity adapted for permitting a flow of the aqueous solution therethrough when acted upon by a surfactant root exudate and/or negative pressure generated by the roots due to water stress. The system further comprises a reservoir that is adapted for holding the aqueous solution therein and is situated in fluid communication with the hydrophilic device's inlet.

At times, however, it is desired to have an option to provide fluid under pressure to the target plants, for example, to germinate seeds, which have not yet developed root systems with which to stimulate the release of the aqueous solution from the tubing or membrane. Under some conditions, it may also be desirable to provide chemigation and/or a gas to the root zone of the plants.

Therefore, it would be desirable to provide a highly efficient system and method for providing multiple fluids to target plants.

SUMMARY

A line, system, and method are provided for delivering a plurality of fluids to a target plant array at a plurality of pressures. The line comprises a plurality of tubes at least portions of which are hydrophilic. The tubes are connected together to form a co-extensive, multi-chambered delivery system. Each tube is connectable at a proximal end to a source of fluid, preferably comprising at least two different fluids.

DETAILED DESCRIPTION OF PREFERRED EMBODIMENTS

Figure 1:
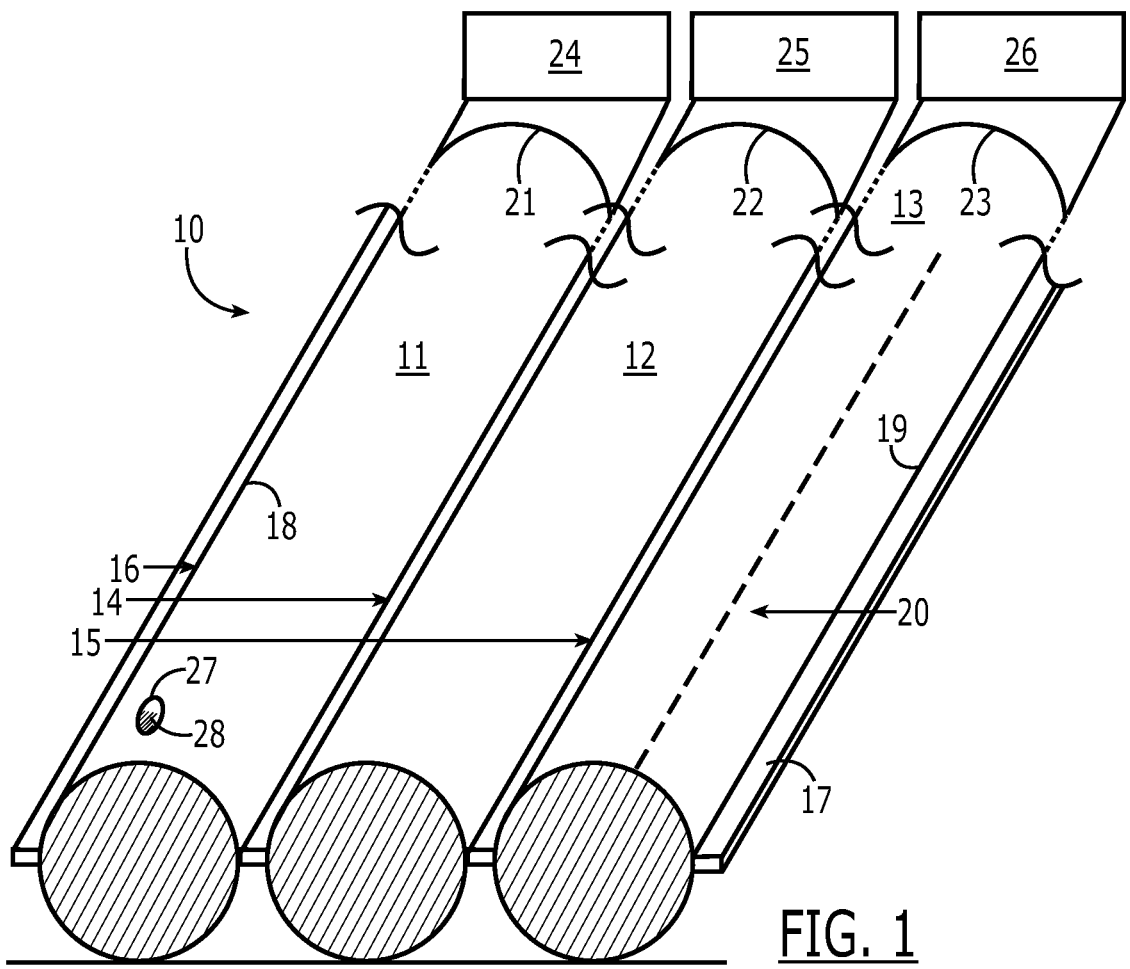
FIG. 1 is a top/front perspective view of a multi-chambered line comprising a plurality of tubes.
Figure 2:
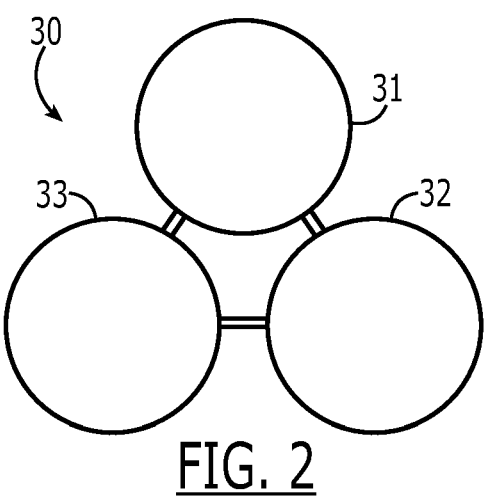
FIG. 2 is a diametric cross-sectional view of another embodiment of a multi-chambered line.
Figure 3:
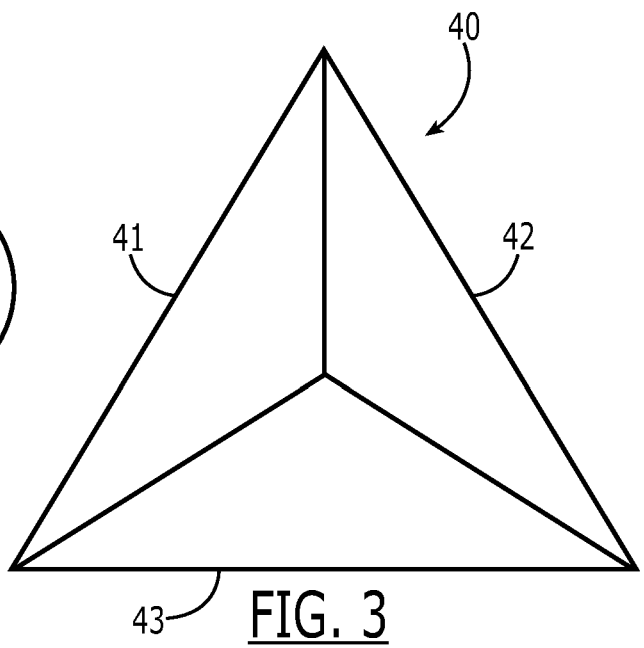
FIG. 3 is a diametric cross-sectional view of a further embodiment of a multi-chambered line.

A system and method for low-pressure irrigation and fertigation will now be presented with reference to FIGS. 1-3.

As used herein, the words "tubes" or "tubing" refer to supply lines for providing fluids to a target plant array. As will be appreciated by one of skill in the art, such "tubes" or "tubing" do not necessarily need to be cylindrical, but may be of any suitable shape, and no limitation is intended by the use of these words.

A line 10, system, and method are provided for delivering a plurality of fluids to a target plant array at a plurality of pressures. The line 10 comprises a plurality of, here, three, tubes 11-13 connected together to form a co-extensive, multi-chambered delivery system. Each tube 11-13 is connectable at proximal ends 21-23 to a source of fluid, preferably comprising at least two, here, three different fluids 24-26.

The line 10, system and method can supply a plurality of fluids to the roots of growing plants wherein the water and/or nutrients are released to the plants as needed by the individual plants. Although not intended as a limitation on the invention, it is believed that when approaching water stress, plant roots can generate negative pressure and/or emit exudates or surfactants that promote the release of water and/or nutrients stored under the conditions described below. Specifically, the plants are supplied fluids from the tubes 11-13, at least portions of which positionable adjacent the plant roots are hydrophilic.

In some embodiments, the tubes 11-13 may include a plurality of holes 27 that are covered by hydrophilic membranes 28; in other embodiments, the entire tube 11-13, the below-surface portion thereof, or a significant portion thereof is hydrophilic. In yet other embodiments, the system may include a surface tube that is water-impermeable or hydrophobic, the tube being connected to a plurality of hydrophilic tubes that can be inserted into a support medium for supplying the roots.

In particular embodiments, plants or seeds are planted in a support medium and the respective tubes 11-13 are connected to reservoirs 24-26 containing water, nutrients, biocides, or a mixture of those or other substance(s) desired to be delivered to the target plants. As discussed above, it has previously been shown that growing plants are capable of distinguishing between these tubes.

Thin-walled microporous hydrophilic tubes are not known to be commercially available for use as irrigation tubing. In a particular embodiment, hydrophilic materials, including Cell-Force™ and Flexi-Sil™, may be made into hydrophilic tubes. Alternatively, some existing hydrophobic thin-walled tubes can be made hydrophilic by a process that uses a water-insoluble hydrophilic polymer (e.g., polyhydroxystyrene, U.S. Pat. No. 6,045,869, co-owned with the present application and incorporated herein by reference). Such solutions applied as a coating to microporous hydrophobic plastic tubing have been shown not to clog the pores and to remain hydrophilic for many years. Thus continuous tubes of spunbonded polyolefin (e.g., DuPont's Tyvek microporous polyethylene) have been used after being made hydrophilic and have been shown to act as a membrane that is responsive to the roots of plants in a subsurface irrigation system.

Spunbonded polyolefin in tube form has been used for irrigation purposes. However, the hydrophobic nature of the polyolefin material permits it to act as a drip source of water for plants without any control by the exudates of the plant roots under higher pressure. The conversion of a hydrophobic surface to hydrophilic has been described in the above-referenced '869 patent and can be used to make spunbonded polyolefin tubing hydrophilic and responsive to the water and/or nutrient needs of the plant.

FIG. 1 illustrates a multi-chambered line 10 comprising three tubes 11-13. Although not intended as a limitation, such a line 10 can be made by forming thermal seals 14,15 between adjacent tubes 11,12 and 12,13 and thermal seals 16,17 along the outer edges 18,19 of the first 11 and the third 13 tube. One of skill in the art will appreciate that such a line 10 may be formed in a multiplicity of ways without departing from the spirit of the invention.

In this exemplary embodiment, the first tube 11 is adapted for delivering an aqueous solution 24 at low pressure. The second tube 12 is adapted for delivering an aqueous solution 25 at a pressure higher than that in the first tube 11. The third tube 13 is adapted for delivering a chemigation agent 26 under pressure. The second tube 12 and/or the third tube 13 could be used, for example, to deliver a fluid 25,26 to a seed that has not yet sprouted roots, wherein the fluid 25,26 is under sufficient pressure to be forced from the second tube 12 and/or the third tube 13 even without the presence of root exudate.

Thus the second 12 and the third 13 tubes can be constructed so that, at elevated pressures, the fluids contained therein "bleed" out therefrom, and thus do not require root exudate for activation. In an embodiment, a plurality of perforations 20 can also be present to aid in fluid delivery.

One of skill in the art will appreciate that any number of designs may be subsumed under the present invention. For example, FIG. 2 illustrates an embodiment 30 wherein the three tubes 31-33 are interconnected to form a substantially triangular cross-section.

In yet another embodiment 40 (FIG. 3), the tubes 41-43 themselves are triangular in cross-section to form a unitary, triangular line 40. Further, the tubes 11-13, 31-33, 41-43 can have varying diameters as desired to achieve a desired fluid delivery rate.

The benefits of the present system are numerous. The lines 10,30,40 permit selective low- and high-pressure delivery of fluids to a target array of plants at different points in the plants' life cycle, or for other reasons as desired. High-pressure delivery permits forced irrigation and/or fertigation. The multi-chambered line permits substantially equal dispersal of fluid to the target plant array.

It is known in the art to lay irrigation lines that are used for only a single growing cycle. The present lines 10,30,40 can be used for multiple seasons, since at least one tube can be used for forced irrigation and/or fertigation.

The lines 10,30,40 of the present invention are relatively simple to manufacture and assemble, making them an attractive alternative to systems currently known in the art.

The addition of fertilizers and chemicals into the root zone of the plants via the described system reduces the required labor and soil preconditioning, as compared with current systems known in the art. In addition, system redundancy is removed, as one installation can replace a plurality thereof, such as three.

What is claimed is:

1. A method for delivering a plurality of fluids to a plant comprising:

positioning a line comprising a first and a second elongated tube longitudinally affixed together in a plant support medium, the first tube having a hydrophilic portion adjacent a plant material planting site, the second tube having a plurality of apertures therethrough for releasing fluid therefrom, and comprising a third elongated tube affixed to the second tube, the third tube comprising means for delivering a third fluid to the plant material, and further comprising, prior to positioning the line, forming the line by affixing the first, the second, and the third tube together so as to substantially form a triangle in axial cross-section, wherein the first, the second, and the third tubes each comprises a substantially triangular structure in axial cross-section, and the line is formed by abutting the first, the second, and the third tubes together to form a substantially triangular structure in axial cross-section;

planting a plurality of plant material adjacent the line in the plant material planting site; and channeling a first fluid into the first tube and a second fluid into the second tube, the second fluid released from the apertures in the second tube when under sufficient pressure, the first fluid released from the first tube when acted upon by exudate from roots of the plant material.

* * * * *